US009360853B2

(12) United States Patent
Kiffmeier et al.

(10) Patent No.: US 9,360,853 B2
(45) Date of Patent: Jun. 7, 2016

(54) EXCHANGE OF FILES AND META-INFORMATION BETWEEN SYSTEM DESIGN TOOLS AND BEHAVIOR MODELING TOOLS AND/OR SIMULATORS FOR THE CREATION OF ECU SOFTWARE

(71) Applicant: dSPACE GmbH, Paderborn (DE)

(72) Inventors: Ulrich Kiffmeier, Harsewinkel (DE); Ulrich Eisemann, Paderborn (DE); Dirk Stichling, Paderborn (DE)

(73) Assignee: dSPACE GmbH, Paderborn (DE)

( * ) Notice: Subject to any disclaimer, the term of this patent is extended or adjusted under 35 U.S.C. 154(b) by 934 days.

(21) Appl. No.: 13/621,773

(22) Filed: Sep. 17, 2012

(65) Prior Publication Data

US 2013/0073063 A1 Mar. 21, 2013

Related U.S. Application Data

(60) Provisional application No. 61/536,404, filed on Sep. 19, 2011.

(51) Int. Cl.
*G06F 9/44* (2006.01)
*G05B 19/042* (2006.01)

(52) U.S. Cl.
CPC .. *G05B 19/0426* (2013.01); *G05B 2219/23008* (2013.01); *G05B 2219/23258* (2013.01)

(58) Field of Classification Search
None
See application file for complete search history.

(56) References Cited

U.S. PATENT DOCUMENTS

| 5,675,802 | A | * | 10/1997 | Allen | G06F 17/30575 717/121 |
| 5,909,689 | A | * | 6/1999 | Van Ryzin | G06F 17/30067 717/122 |
| 7,010,580 | B1 | * | 3/2006 | Fu | G06F 21/6218 707/999.104 |
| 7,797,334 | B2 | * | 9/2010 | Srivastava | H04L 67/06 717/121 |
| 7,810,067 | B2 | * | 10/2010 | Kaelicke | G06F 8/20 717/121 |
| 7,941,786 | B2 | * | 5/2011 | Scott | H04N 5/4403 717/120 |
| 8,296,733 | B2 | * | 10/2012 | Phillips | G05B 19/056 717/120 |

(Continued)

FOREIGN PATENT DOCUMENTS

DE 10 2008 052 534 A1 4/2009

OTHER PUBLICATIONS

Weisgerber, et al., "Exploring Evolutionary Coupling in Eclipse"; 2005 IBM; [retrieved on Feb. 4, 2016]; Retrieved from Internet <URL:http://dl.acm.org/citation.cfm?id=1117703>;pp. 31-34.*

(Continued)

*Primary Examiner* — Xi D Chen
(74) *Attorney, Agent, or Firm* — Muncy, Geissler, Olds & Lowe, P.C.

(57) ABSTRACT

A computer project management system and method for the creation of an electronic control unit software is provided. The system has a software architecture tool configured to design a graphical model of an electronic control unit for a motor vehicle. A behavior model tool converts the graphical model into a computer readable production code. A software container has a file generated based on the electronic control unit. A container manager compares the software container with a prior software container during the importation or exportation of the software container to or from the software architecture tool or the behavior model tool, and a comparison list is generated indicating whether interface modifications for the electronic control unit were made. The comparison list is then displayed to a user on a display screen.

24 Claims, 4 Drawing Sheets

(56) References Cited

U.S. PATENT DOCUMENTS

| | | | | |
|---|---|---|---|---|
| 8,341,590 B1* | 12/2012 | Poole | ............ | G06F 8/71 717/122 |
| 8,352,905 B2* | 1/2013 | Chouinard | ............ | G06F 8/20 717/100 |
| 8,429,608 B2* | 4/2013 | Son | ............ | G06F 8/10 706/47 |
| 8,434,056 B2* | 4/2013 | Windley | ............ | G06F 8/40 717/106 |
| 8,473,894 B2* | 6/2013 | Fox | ............ | G06F 9/44 717/101 |
| 8,627,308 B2* | 1/2014 | DeLuca | ............ | G06F 8/30 717/122 |
| 8,667,465 B2* | 3/2014 | Poole | ............ | G06F 8/71 717/122 |
| 8,701,083 B2* | 4/2014 | Madkour | ............ | G06F 8/20 717/120 |
| 8,789,013 B1* | 7/2014 | Lloyd | ............ | G05B 11/011 717/121 |
| 8,935,297 B2* | 1/2015 | Coyne | ............ | G06Q 10/06 717/120 |
| 2004/0128646 A1* | 7/2004 | Jindal | ............ | G06Q 10/06 717/122 |
| 2007/0061154 A1* | 3/2007 | Markvoort | ............ | G06F 17/50 705/51 |
| 2009/0024647 A1* | 1/2009 | Hein | ............ | G06Q 10/04 |
| 2012/0324425 A1* | 12/2012 | Roberts | ............ | G06F 8/33 717/123 |
| 2013/0031530 A1* | 1/2013 | Pinkerton | ............ | G06F 9/4448 717/120 |
| 2013/0167118 A1* | 6/2013 | Borgianni | ............ | G06F 17/30876 717/121 |

OTHER PUBLICATIONS

Vanlande, et al., "Managing IFC for Civil Engineering Projects"; 2003 ACM; [retrieved on Feb. 4, 2016]; Retrieved from Internet <URL:http://dl.acm.org/citation.cfm?id=956899>;pp. 179-181.*

Takata, Ma "Proactive Control of Group Revision Assistance Management Using P2P Technology"; 2004 International Symposium on Communications and Information Technologies; [retrieved on Feb. 5, 2016]; Retrieved from Internet <URL:http://ieeexplore.ieee.org/stamp/stamp.jsp?tp=&arnumber=1413892>;pp. 1112-1117.*

NPL_Linn(A Multi-Agent System for Cooperative Document Indexing and Querying in Distributed Networked Environments; 1999 International Workshops on Parallel Processing; [retrieved on Feb. 5, 2016]; Retrieved from Internet <URL:http://ieeexplore.ieee.org/stamp/stamp.jsp?tp=&arnumber=800092>;pp. 1-6.*

* cited by examiner

EXCHANGE OF FILES AND META-INFORMATION BETWEEN SYSTEM DESIGN TOOLS AND BEHAVIOR MODELING TOOLS AND/OR SIMULATORS FOR THE CREATION OF ECU SOFTWARE

This non provisional application claims priority to U.S. Provisional Application 61/536,404, which was filed on Sep. 19, 2011, and which is incorporated herein by reference.

BACKGROUND OF THE INVENTION

1. Field of the Invention

The present invention relates to the exchange of files and meta-information between system design tools and behavior modeling tools and/or simulators for the creation of Electronic Control Unit (ECU) software.

2. Description of the Background Art

Electronics in vehicles are gaining more and more significance. The number of microcontrollers in the automobile is consistently increasing. With the increasing number of electronic control units, the amount and complexity of functions engineers must design, code, test, and implement increases as well. Virtual ECU software emulates a real ECU in a simulation scenario. The ECU software can comprise components from the application and the basic software, and provides functionalities comparable to those of a real ECU or software code dedicated for a real ECU.

Today's ECU software comprises numerous software components (SWCs) with intensive interactions. In large ECU networks frequently installed in current vehicles, the number of SWCs can easily reach the thousands. Because the task of developing ECU components is usually shared by several departments or even different companies, not only the SWCs themselves have to be tested and validated, but also the interactions between them. The earlier in the development process that errors and inconsistencies are found, the quicker and cheaper it is to correct them.

In the creation of ECU software, files and meta-information are exchanged between several parties and in different context. For example the files and meta-information are exchanged between the system architect and the function developer, between a system design tool and a behavior modeling tool, between different projects in the same or different system design tools, between different projects in the same or different behavior modeling tools. The files and information may regard ECU software created according to the AUTOSAR methodology or not according to this methodology and may regard a real ECU or a virtual ECU. FIG. 1 illustrates an example how, according to the AUTOSAR methodology, architecture or AUTOSAR authoring tools 1 used by the system architect and a behavior modeling tool 2 work together by exchanging standardized AUTOSAR ARXML files. A key element in this is the Software Component Template, which describes the content of AUTOSAR software components. The software architect decomposes the entire software into a number of software components (SWC) 3 and makes sure that the software components communicate with one another through compatible interfaces. The software architect typically exchanges ARXML files with multiple function/software developers who use the behaviour modeling tool 2 to provide the implementation of individual software components. Typically, the development of software components is an iterative process in which ARXML files, source code, and variable description (A2L) files are exchanged multiple times between the system architecture tool 1 and the behaviour modeling tool 2 to accommodate changes.

Thus, many files are generated during software creation. These files, however, must be appropriately managed. The ASAM AE CC (container catalog) was thus introduced to make this management easier, which is a generic approach for exchange of engineering data and its configuration. It describes the meta data of a set of objects (e.g. files) in an exchange container which is exchanged between repositories or tools. In other words, this standard defines a meta-model, which is used to organize the file exchange among those involved in an ECU development project. The files to be exchanged and some additional information are written in the form of an XML file. The container catalog facilitates the exchange of relevant data by predefining a fixed format according to which the users collect and pass on the appropriate files and meta-data.

Examples of types of files to be exchanged are the exchange formats defined by the AUTOSAR (AUTomotive Open System ARchitecture) standard, in the form of ARXML files (AUTOSAR XML), with which AUTOSAR-related data are transferred between development tools. Apart from ARXML files, the development of AUTOSAR-compliant software also involves numerous other file types which must be exchanged between the software architect, component developer, software integrator, and tester. Thus, the behavior modeling tool generates code files for implementing components that are used, for example, for component and software integration tests in the development process. In addition, documentation files for describing component design can be exchanged, just like A2L files for calibration and measurement, where this is still not sufficiently enabled by the AUTOSAR standard. These files and the AUTOSAR-standardized ARXML format require special handling in carrying out round trips, as typically occur during the development of AUTOSAR-compliant application software.

The creation of the container is problematic, particularly in iterative processes of software creation in which files pass repeatedly back and forth between the different users (system architect and function developer).

After each modification, all relevant files must be searched together and the most recent versions stored in the container. This, however, is time-consuming and error-prone for the function developer or system architect to describe consistently all function information and meta-data after code generation, or to collect and store them in the ASAM container. The developer must retain an overview over a vast amount of data and files and it must be assured that files or data are not inadvertently overwritten. Additional difficulties arise, for example, due to name modifications and obsolete files.

Thus, there is a problem when a container is typically transferred by a second user to a first user, and if the first user has an older version, he has difficulty determining which of the many files were modified or updated by the second user and which updates he should adopt.

SUMMARY OF THE INVENTION

It is therefore an object of the present invention to simplify the management of files and meta-data during their exchange between different users and tools.

The attainment of the abovementioned object includes a container management system, which automatically updates or generates containers, performs a synchronization according to predefinable rules, and in addition offers a graphical user interface for comparing various container versions with an integrated comparison tool.

The containers can be automatically generated from behavior modeling tools, such as TargetLink from dSPACE and/or a software architecture tool, such as SystemDesk also from dSPACE. An export and import function for containers is provided. This creates the appropriate XML file, for example, in the ASAM format (CC format) or other formats, such as, container formats regarding the Open Packaging Convention. In addition, the clarity can be facilitated with a GUI, which shows the different containers, collections of containers (container sets), or also files in a comparison, with differences or updates being flagged.

In an exemplary embodiment, a method for exchanging files and/or information for an overall development project between two development projects is provided that uses a computer system that includes a first development environment with a first development project and a second development environment with a second development project to develop software for an electronic control unit of a vehicle, for example, a motor vehicle, air and space vehicle, robotics, motors, etc. The computer system has a first memory region, in which a number of different types of files belonging to a first development project, and a first file collection container or set of containers, which contains all files relevant for the overall development project and belonging to the first development project, are stored. In the first development environment, a first management unit, in which initial information for all files belonging to the first development project is stored. Via the first management unit for the purpose of export, it is checked whether all files relevant to the overall development project and belonging to the first development system are inserted in a current version in the first file collection. Then, via a management unit, the first file collection is updated in that all files relevant to the overall development project and belonging to the first development system are included in a most recent version in the first file collection or left in the current version and deleting obsolete files. The updated first file collection is provided to the second development environment, which has a second management unit, in which second information on all files belonging to the second development project are stored. The computer system also has a second memory region, in which a number of different types of files belonging to the second development project and a second file collection, in which all files relevant to the overall development project and belonging to the second development project are included, are stored. Via the second management unit a task of synchronizing and/or updating the second file collection and the files belonging to the second development project via the exported first data collection and importing the updated files into the second development project is performed. A rule set is stored in the first memory region and/or in the second memory region, the exporting of the first file collection and/or the importing of the second file collection occurs by the respective management unit according to the rules defined in the rule set. Different types of files and categories are defined for the different types of files in the rule set, and the task of assigning at least one category to the file is performed, via the first management unit during the incorporation of files in the file collection.

In an embodiment, a computer project management system is provided that has a software architecture tool configured to design/model a software architecture having software components, data files and interface definitions for an electronic control unit. A behavior model tool is configured to convert a graphical model for a control program for an electronic control unit into a computer readable production code to be included into the software components. A software container has a file generated for development of software for the electronic control unit, the software container being imported or exported by either the software architecture tool or the behavior model tool. A container manager is configured to compare the software container with a prior software container during the importation or exportation of the software container to or from the software architecture tool or the behavior modeling tool, the container manager generating a comparison list indicating whether modifications in any of the software files/components for the electronic control unit were made and indicating a category for at least one of the software files, the comparison list being displayed to a user on a display screen, the container manager synchronizing the software container with the prior software container according to a predefined set of rules.

In an embodiment, a container manager for a computer project management system is provided that includes a rule set stored in a memory area, the rule set defining file categories and import and/or export behavior according to the file categories. A comparison component is configured to compare a first software container having a first set of data files including an AUTOSAR XML file generated by a software architecture tool based on a software architecture for an electronic control unit for a motor vehicle that is defined/modeled in the architecture modeling tool and compare first data files with a second software container having a second set of data files and a second AUTOSAR XML file or a second version of the first AUTOSAR XML file generated by a behavior modeling tool. Whereby the comparison component generates a comparison list indicating modifications in any of the software files/components for the electronic control unit, and the container manager synchronizes the first software container with the second software container according to a predefined set of rules.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
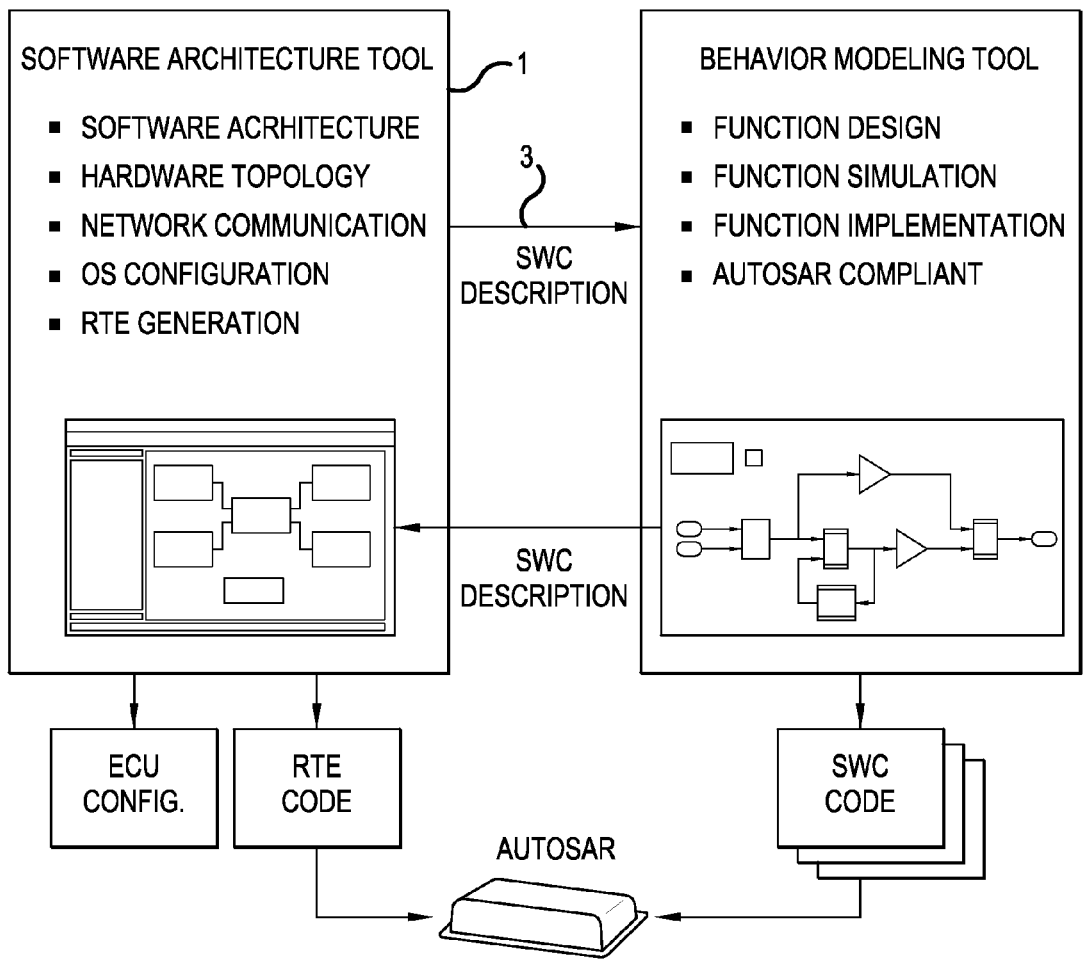
FIG. 1 illustrates a conventional AUTOSAR exchange process including a software architecture tool and a Behavior modeling tool used in an AUTOSAR tool chain.
Figure 2:
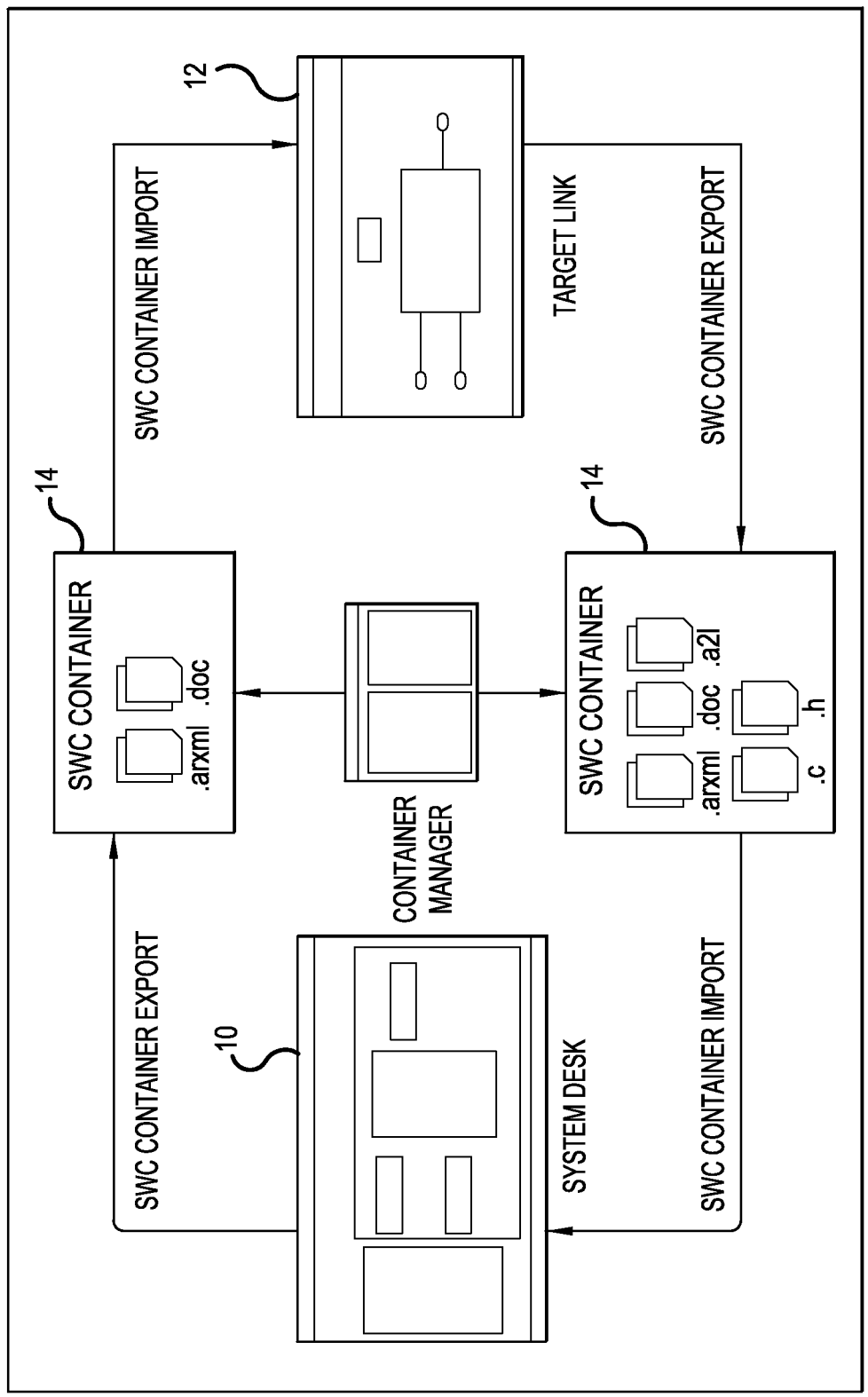
FIG. 2 illustrates an exchange of SWC containers between an architecture tool and a behavior modeling tool in an AUTOSAR-compliant development process, according to an exemplary embodiment of the present invention.

A method and device of the invention will be described below in conjunction with FIG. 2. Referring to FIG. 2, there is shown a software architecture tool 10 and a behavior modeling tool 12 during the creation of a software component (SWC) in a software architecture. In this regard, the software component is part of the software architecture in the form of numerous interconnected components, which divide the overall functionality into units to be developed separately.

Without limiting the generality, it is assumed that the development of the software component with the specification of the component including its ports and interfaces is begun by the software architect in the software architecture tool 10. To provide the component developer with the specifications of a component and its interfaces, the architect exports a SWC container 14 from the software architecture tool 10, which contains at least the exported ARXML files and can be supplemented by the architect with other specification documents. SWC containers 14 are used to hold all relevant files and are supplemented successively with other artifacts during the AUTOSAR round trip.

The user of the behavior modeling tool 12 begins the component implementation activities by importing the SWC container 14 provided by the architect and the ARXML files it contains. The predefined interface specifications for the component can be used initially to generate an AUTOSAR frame model. This must then be filled out with the actual algorithmics of the control and regulation function. The automatic specification of the frame model significantly simplifies the model-based design of the component. The user performs offline simulations in the model-in-the-loop mode (e.g. by testing the model by using the executable model in the Behavior modeling tool), generates the AUTOSAR-compliant code, and simulates it in the form of software-in-the-loop simulations (e.g. by simulating the generated ECU-Code on the host computer) and processor-in-the-loop simulations (e.g. by simulating the generated ECU-Code on the target processor) until the desired functionality is realized and the software component is implemented as a result. The behavior modeling tool 12 typically covers the steps: design, implementation, and testing of individual components, with the entire spectrum of the model-based techniques being able to be used. After completion of these activities, an updated SWC container 14 is exported, which contains not only the ARXML files augmented with implementation information but also additional artifacts. The latter are in particular the source files for implementing the component and, if necessary, documentation files or A2L files for simplified carrying out of integration tests.

In an exemplary embodiment, to assure that the container file is current when the software container 14 is exported from either the software architecture tool or behavior modeling tool 12, a container manager, which can also be arranged in either the software architecture tool 10 or the Behavior modeling tool 12, analyzes which files were created last for a component and inserts these files in the appropriate container (comparison between the RAM of the project and files stored "on the disk"/in the read-only memory). In so doing, categories are assigned (change by the user is possible, e.g., in the export dialog or in the container manager (see below)). Both AUTOSAR files and function code files are analyzed.

The container manager analyzes the project and identifies all elements that belong to the SWC description. These elements can include, for example, SWCs, interfaces, data types, scalings, computational methods, mode declaration groups, etc. These elements can be referenced directly or indirectly by the SWC and are dispersed over the entire project or different packages.

The automatic collection of these objects reduces the risk that required files are overlooked or that the most recent version is not inserted in the container. No longer available files are automatically deleted from the SWC container. Thus, the user is relieved of the arduous and error-prone task of having to gather the elements himself and to manage the file lists and meta-information himself.

To simplify the export further and to rule out errors, the export occurs according to predefined rules, which are stored in the container manager.

For example, selection of all project files which are exported can occur in compliance with rules. For example, it can be specified that during the export from the behavior model tool to the software architecture tool only files are to be transferred for which the function developer is responsible. Files that only the system architect may modify are not exported during the transfer to the software architecture tool according to such rules.

Such rules can be implemented, for example, in that each file during export is assigned to a category that is predefined by the rules.

Criteria for the assignment of a category may include, for example, that a C file created by the behavior modeling tool is given the category "Code.Component." These files are overwritten in each code generation in the behavior modeling tool. They are copied from the behavior modeling tool to the software architecture tool but not in the opposite direction. Another criteria can include, for example, that a C file generated by the behavior modeling tool with lookup functions is given the category "Code.Shared," because these lookup functions can be used jointly by several software components. This file is only overwritten in the round trip, when the user explicitly permits this. The file is then handled according to the rules for the assigned category.

The first iteration in the development process is finally completed by the software architect or integrator who imports the new SWC container into the software architecture tool.

The import of the new SWC container comprises two process steps: (1) synchronization of the local container, i.e., the one to be updated, with the external container, i.e., the one to be imported, with the use of predefined process rules (first synchronization with "the disk"/read-only memory; then imported into the "project" of the development environment into which it is to be imported); and (2) the import of the updated files from the local, synchronized container into the current project.

The import according to the invention thereby includes the flexible transfer of all files listed in the SWC container. These are firstly those of the updated ARXML files. At the same time, however, the source and A2L files provided in the container can be used to test the interaction of individual components in the software architecture. A build process for generating a simulation target can be initiated for this in the software architecture tool based on a generated runtime environment and the source files of individual components.

Examples of process rules are: a code file automatically generated by behavior modeling tool is overwritten automatically with a more recent version by the synchronization. A manually created code file is not replaced. Another example is that the library function or header file that is used by several components is not automatically overwritten, but only when the user wants this to occur. Files that also have an impact on other components should be modified only with caution. Thus, files are stored according to their category or the associated rule. The user can establish the folder structure by the configurability of the rules.

In a real development process, iterations basically occur with the result that the round trip outlined in FIG. 2 is run through repeatedly. This can be caused, for example, by modifications to the interfaces or by the insertion of additional ports in software components. The concept of the SWC container with the associated import and export functionalities focuses specifically on minimizing the number of the required user interactions in the round trip. Configuration files can be used to adapt the rules for import and export of SWC containers to project- or client-specific process workflows. This specifies, for example, which user may overwrite or modify which file types and the development process is thereby safeguarded against unwanted changes. In general, the rule set can be expanded by the user or adapted to his requirements.

Figure 3:
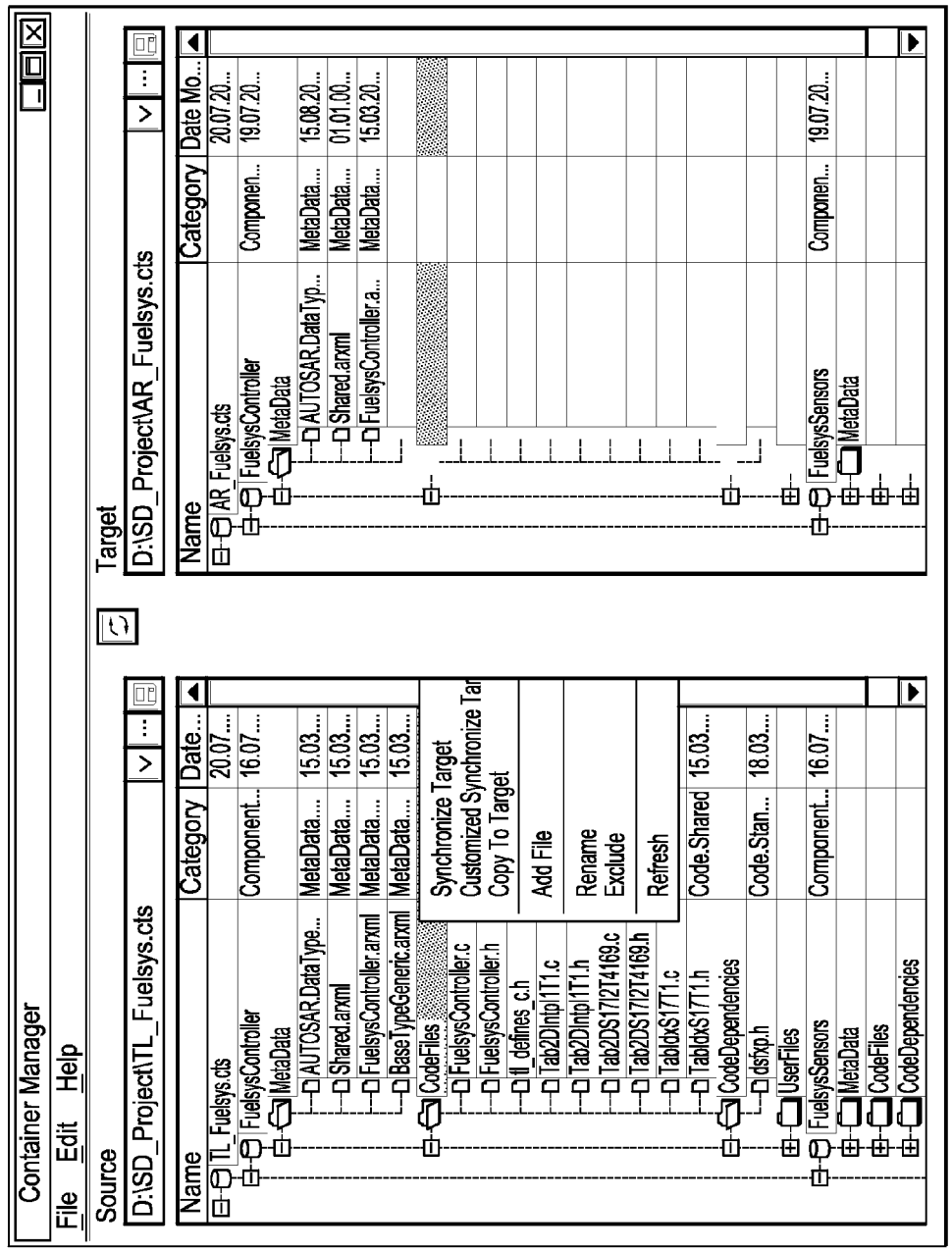
FIG. 3 illustrates a SWC Container Manager as a graphical user interface for comparing two SWC containers and the artifacts they contain, according to an exemplary embodiment of the present invention.

For managing SWC containers, there is in addition a specialized tool with graphical user interfaces in the form of the SWC container manager (CM), see FIG. 3. For instance, additional specification documents can be added to a SWC container and then exchanged afterwards in the round trip between Software architecture tool and Behavior modeling tool. The SWC container manager in particular allows the visual comparison of two SWC containers or the artifacts in them based on a comparison tool. The contents of two containers are preferably indicated in a way that allows them to be easily compared. As a result, different project versions, as inevitably occur in a round trip, can be visualized and examined for differences. Preferably it is indicated by the color in which the file name is written in the list whether a file is new, modified or unchanged. The software architect through a comparison of his own SWC container with the one provided by the Behavior modeling tool user obtains an overview whether the specifications predefined by the ARXML files were perhaps modified incorrectly. Conversely, the behavior modeling tool user with the use of the SWC container manager gains a rapid overview whether interface modifications, for instance, were made by the architect, which require changes in the model-based design. Thus, the concept of the SWC container exchange between Software architecture tool and Behavior modeling tool goes beyond the mere import or export of ARXML files and thus substantially facilitates the round trip in the AUTOSAR development process.

The GUI can also show several containers simultaneously, e.g., a so-called container set, which comprises all containers of the system architecture project or list them in an XML file and make reference to them. Differences between the left and right version (source and target) can be indicated on the screen. The container manager can also have a synchronization function for all levels (files, groups, containers, container sets), so that the synchronization can be initiated from the container manager instead of from the software architecture tool or the behavior modeling tool. The rules for export and/or import, i.e. synchronization of software containers may be implemented in the form of an XML workflow file which may be deposited within the software architecture tool and/or the Behavior Modeling tool and/or the container manager.

For comparison of two files, commercial diff/merge tools can be started from the container manager. Container management and restructuring are possible with the container manager, because the files can be ordered with use of the GUI. New containers can be created and old containers restructured or deleted. New files can also be added.

Figure 4:
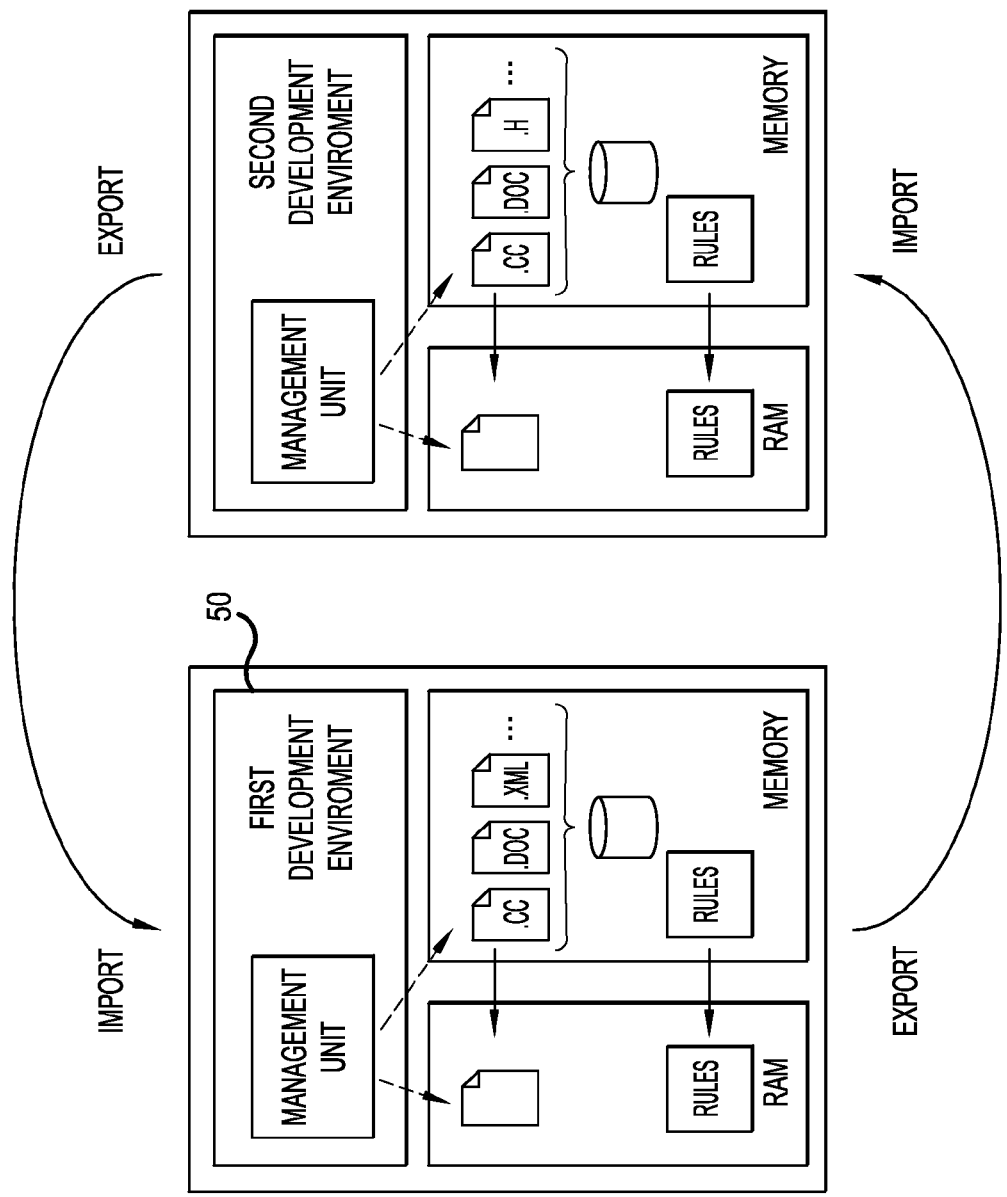
FIG. 4 illustrates a schematic illustration of a development environment according to an exemplary embodiment of the present invention.

FIG. 4 illustrates a schematic illustration of a development environment according to an exemplary embodiment in which files and/or information are exchanged for an overall development project between two development projects in a computer system; a first development environment 50 with a first development project and a second development environment with a second development project. The computer system has a first memory region, in which a number of different types of files belonging to a first development project, and a first file collection container or set of containers, which contains all files relevant for the overall development project and belonging to the first development project, are stored.

In the first development environment (e.g. a software architecture environment), a first management unit is provided in which initial information for all files belonging to the first development project are stored. During an export, via the first management unit, it is checked whether all files relevant to the overall development project and belonging to the first development system are inserted in a current version in the first file collection. Thereafter, via management unit, the first file collection is updated in that all files relevant to the overall development project and belonging to the first development system are included in a most recent version in the first file collection or left in the current version and obsolete files are deleted according to the user-defined rules.

The updated first file collection is provided to the second development project, whereby the second development environment has a second management unit, in which second information on all files belonging to the second development project are stored. The computer system has a second memory region, in which a number of different types of files belonging to the second development project and a second file collection, in which all files relevant to the overall development project and belonging to the second development project are included, are stored.

The second file collection and the files belonging to the second development project are synchroned and/or updated, via the second management unit, and based on the exported first data collection and then the updated files are imported into the second development project.

A rule set is stored in the first memory region and/or in the second memory region, and the exporting of the first file collection or the importing of the second file collection occurs by the respective management unit according to the rules defined in the rule set.

Different types of files and categories for the different types of files are defined in the rule set. At least one category is assigned to the file via the first management unit during the incorporation of files in the file collection.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for exchanging files and/or information for an overall development project between two development projects, the method comprising:
providing a computer system that includes a first development environment with a first development project and a second development environment with a second development project to develop software for an electronic control unit, the computer system having a first memory region, in which a number of different types of files belonging to the first development project, and a first file collection container or set of containers, which contains all files relevant for the overall development project and belonging to the first development project, are stored;
providing, in the first development environment, a first management unit, in which initial information for all files belonging to the first development project are stored;
checking, via the first management unit for the purpose of export, whether all files relevant to the overall development project and belonging to the first development project are inserted in a current version in the first file collection;

updating, via the first management unit, the first file collection, in that all files relevant to the overall development project and belonging to the first development project are included in a most recent version in the first file collection or left in the current version and deleting obsolete files;

exporting the updated first file collection to the second development environment, the second development environment having a second management unit, in which second information on all files belonging to the second development project are stored, the computer system having a second memory region, in which a number of different types of files belonging to the second development project and a second file collection, in which all files relevant to the overall development project and belonging to the second development project are included, are stored, synchronizing and/or updating, via the second management unit, the second file collection and the files belonging to the second development project via the exported updated first file collection and importing the updated files into the second development project;

storing a rule set in the first memory region and/or in the second memory region, the exporting of the first file collection and/or the importing of the second file collection occurs by the respective management unit according to the rules defined in the rule set;

defining different types of files and categories for the different types of files in the rule set; and assigning, via the first management unit, at least one category to the files during the incorporation of files in the first file collection.

2. The method according to claim 1, wherein it is established in the rule set for each category whether the files assigned to the category for export purposes in the first file collection are overwritten/updated, deleted, or left intact.

3. The method according to claim 1, wherein it is established in the rule set for each category whether the files assigned to the category in the second file collection during import of the first file collection into the second development project are overwritten/updated, deleted, or left intact.

4. The method according to claim 1, wherein the file collection exchange occurs from the second development project to the first development project and whereby in the rule set it is considered whether the file collection exchange occurs from the first to the second development project or from the second to the first development project.

5. The method according to claim 1, wherein the rule set can be configured by a user.

6. The method according to claim 1, wherein the computer system has a file collection management unit with a graphical user interface (GUI) and access to the first and/or second memory area, which shows the first file collection and/or the second file collection, and wherein the files included in the respective file collection are listed hierarchically and whereby the assigned category is indicated for each file.

7. The method according to claim 1, wherein the first file collection and the second file collection are shown in a comparison mode.

8. The method according to claim 1, wherein by means of the file collection management unit a comparison and/or merge of the first file collection and the second file collection is performed.

9. The method according to claim 6, wherein the rules for the rule set can be configured by means of the GUI of the file collection management unit by a user.

10. The method according to claim 1, wherein the rules for the rule set can be input by a user by means of a symbolic language.

11. The method according to claim 1, wherein the rules that apply to a file in a concrete scenario are visualized to a user for inspection.

12. The method according to claim 11, wherein the rules are visualized to the user via a display device.

13. The method according to claim 1, wherein the first and/or the second management unit is/are connected to a version control program or an enterprise data management program.

14. The method according to claim 1, wherein the files belonging to the first development project or the files belonging to the second development project comprise virtual electronic control devices.

15. The method according to claim 1, wherein the first and the second development environments each have a RAM memory in addition to the respective first memory region and the second memory region, wherein during ongoing operation of the first or the second development environment a first subset of the files belonging to the corresponding development environment is also stored in the corresponding RAM memory, wherein the corresponding development environment has access to the corresponding files in the particular RAM memory, and wherein the first management unit, to update the first file collection, performs a comparison between the files in the RAM memory of the first development environment and the files belonging to the first development project in the first memory region of the first development environment.

16. The method according to claim 6, wherein the file collection management unit is realized, without the first development environment or the second development environment having been started.

17. A project management computer system comprising:
a computer including:
a software architecture tool configured to design/model a software architecture having software components, data files and interface definitions for an electronic control unit; and
a behavior model tool configured to convert a graphical model for a control program for an electronic control unit into a computer readable production code to be included into the software components;
a software container containing therein a file generated for development of software for the electronic control unit, the software container being exported from the software architecture tool and imported by the behavior model tool or exported from the behavior model tool and imported by the software architecture tool; and
a container manager configured to compare the software container with a prior software container during the importation or exportation of the software container to or from the software architecture tool or the behavior modeling tool, the container manager generating a comparison list indicating whether modifications in any of the software files/components for the electronic control unit were made by the software architecture tool or the behavior modeling tool and indicating a category for at least one of the software files, the comparison list being displayed to a user on a display screen, the container manager synchronizing the software container with the prior software container according to a predefined set of rules.

18. The project management computer system according to claim 17, wherein the software container generates an AUTOSAR (Automotive Open System Architecture) XML file.

19. The project management computer system according to claim 17, wherein the user may modify the synchronization rules by editing the list.

20. The project management computer system according to claim 17, wherein the predefined set of rules comprises:
definitions of software file categories, wherein file categories are defined according to a file type and/or an owner of the file and/or a responsibility for the generation of the file and/or whether the file is a shared file; and
workflow rules for synchronization of the software container with the prior software container, wherein the rules are defined, according to the category and/or based on whether the synchronization of the software container occurs during a data exchange from the software architecture tool to the behavior modeling tool or vice versa, and/or whether a file is incorporated into the synchronized version of the software container and/or whether a file is overwritten and/or whether a file is left intact.

21. The project management computer system according to claim 17, wherein it is defined in the predefined set of rules:
that during import from the behavior modeling tool to the software architecture tool only files are to be transferred for which a function developer is responsible; and/or
that files that are in the responsibility of a system architect are not exported during a transfer of the software container to the software architecture tool; and/or
that files generated by the behavior modeling tool (code files for functional behavior of the electronic control unit) are copied from the behavior modeling tool to the software architecture tool but not from the software architecture tool to the behavior modeling tool; and/or
that files generated by the behavior modeling tool are overwritten in each code generation in the behavior modeling tool; and/or
that files generated by the behavior modeling tool that are used jointly by several software components are only overwritten in a round trip when a user explicitly permits this; and/or
that a file automatically generated by the behavior modeling tool is overwritten automatically with a more recent version during synchronization; and/or
that a manually created file is not replaced; and/or
a library function or header file that is used by several components is not automatically overwritten, but only upon selection by the user.

22. A container manager for a project management computer system, the container manager comprising:
a computer;
a memory including a memory area;
a rule set stored in the memory area, the rule set defining file categories and import and/or export behavior according to the file categories; and
a comparison component configured to compare a first software container having a first set of data files including an AUTOSAR (Automotive Open System Architecture) XML file generated by a software architecture tool based on a software architecture for an electronic control unit for a motor vehicle that is defined/modeled in the architecture modeling tool and that is exported to a behavior modeling tool and compare the first set of data files with a second software container having a second set of data files and a second AUTOSAR XML file or a second version of the first AUTOSAR XML file generated by the behavior modeling tool and that is exported to the software architecture tool,
wherein the comparison component generates a comparison list indicating modifications in any of the software files/components for the electronic control unit, and
wherein the container manager synchronizes the first software container with the second software container according to a predefined set of rules.

23. The container manager according to claim 22, wherein the electronic control unit is a virtual electronic control unit.

24. The container manager according to claim 22, further comprising a display component for displaying the comparison list to a user of the software architecture tool or the behavior model tool via a display screen.

* * * * *